April 20, 1926.
M. TUCKER
1,581,990
BASKET HANDLE AND COVER CLAMP
Filed August 13, 1925
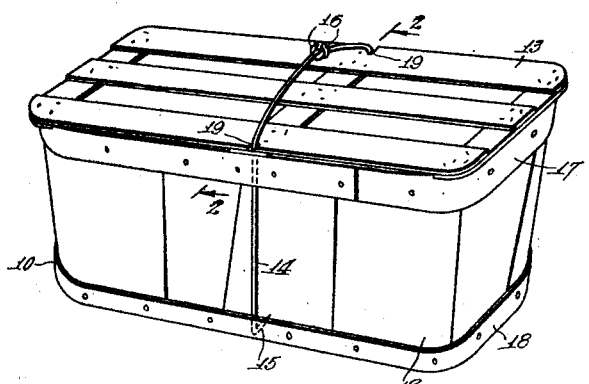
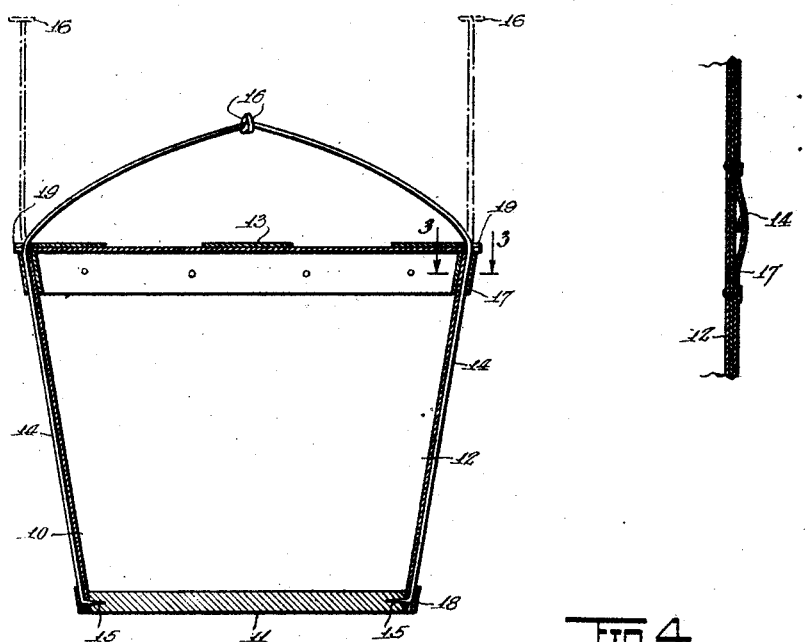
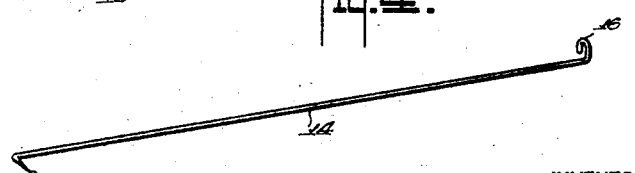
WITNESSES
INVENTOR,
Major Tucker,
BY
ATTORNEYS.

Patented Apr. 20, 1926.

1,581,990

UNITED STATES PATENT OFFICE.

MAJOR TUCKER, OF BROCTON, NEW YORK.

BASKET HANDLE AND COVER CLAMP.

Application filed August 13, 1925. Serial No. 50,113.

*To all whom it may concern:*

Be it known that I, MAJOR TUCKER, a citizen of the United States, and a resident of Brocton, in the county of Chautauqua and State of New York, United States of America, have invented a new and Improved Basket Handle and Cover Clamp, of which the following is a full, clear, and exact description.

This invention relates to handle constructions for baskets and has especial reference to handle constructions which also serve for clamping the cover of a basket in place.

An object of the present invention is to provide a basket with a handle construction which will permit a number of baskets to be nested for the conservation of space either in the shipment of quantities of baskets or in the storing of baskets.

Another object of the invention is to incorporate in a basket construction handle elements which may be adjusted or conditioned to permit a number of baskets to be nested, and which handle elements may be brought together in interlocking relationship to constitute a finished handle for the basket.

Another object of the invention is to provide a handle construction for a basket in which handle elements are prevented from being torn loose and which serve in conjunction with portions of a cover for the basket for holding the cover in place.

With the foregoing and other objects in view, the invention resides in the particular provision, construction and functions of the essential parts hereinafter fully described and illustrated in the accompanying drawing, in which:

Figure 1 is a perspective view of a basket with the handle construction and cover clamp of the present invention applied thereto.

Fig. 2 is a transverse sectional view taken substantially on the line 2—2 of Fig. 1.

Fig. 3 is a detail sectional view taken substantially on the line 3—3 of Fig. 2.

Fig. 4 is an elevation of one of the handle forming members.

As before stated, it is one of the objects of the invention to nest the baskets for the purpose of conserving space and the fact that a number of baskets may be nested because of the handle characteristics, it will facilitate the distribution of the baskets in the field where packing operations are carried out, and it also maintains the baskets in proper shape and keeps them from drying out.

By referring now to the several views of the drawing, it will be apparent that, there is shown a basket 10 of the ordinary type which includes a bottom 11, side and end splints 12 and a cover 13 which is adapted to rest upon the upper edges of the basket receptacle. Use is made of a pair of handle forming members 14 which are similar in construction, each consisting of a length of stout wire inherently flexible and therefore bendable, with a spur 15 angularly disposed at one end and a hook 16 at the opposite end. The hook 16 is disposed at an angle and is of substantially U-shape. The handle forming members 14 are applied respectively at opposite sides of the basket receptacle directly opposite each other. The handle forming members are applied before the upper and lower outside bands 17 and 18 respectively are put on; the reason being to make it impossible for the handle forming members to be torn loose when subjected to the most extreme rough usage. In the application of the handle forming members the spur 15 of each is driven into the bottom 11, as shown most clearly in Fig. 2.

In order that a number of baskets may be nested, each of the handle forming members 14 will have its free upper end portion with the hooks 16 thereon disposed substantially vertical as shown in dot and dash lines in Fig. 2. In carrying out the filling of a basket with certain produce such as grapes, the hooks 16 of the handle forming members may be placed in interlocking relationship to facilitate the handling of the basket. After the basket has been filled the hooks 16 may be disengaged and the free extremities of the members 14 may again be bent outwardly to permit the application of the cover 13. The cover 13 is provided in the opposite side edges thereof with notches 19 which accommodate portions of the free extremities of the members 14 to set up a clamping action against portions of the cover to prevent the same from being displaced and to hold it securely down on the upper edges of the basket. The free extremities of the members 14 are then bent inwardly over the basket which is followed by the hook 16 of one member 14 being snapped in engagement with a portion of the other member 14, and the hook of the latter is snapped into engagement with a portion of the former member 14, as shown most clearly in Figs. 1 and 2. The two hooks 16 provide portions which engage each other and hold the free extremities of the members 14 against being separated. The handle thus formed places most of the strain on the bottom of the basket, and the force of any weight on the handle tends to lock the hook ends more securely at the interlocking point.

I claim:

1. A handle for a basket comprising two members of wire each having a spur at one end impaled in the bottom of the basket receptacle at one side and extending upwardly between portions of the basket receptacle, portions of said members extending beyond said upper side edges being flexible and constituting handle forming portions, and means on the free end of one of said handle forming portions which coacts with means on the free end of the other handle forming portion to releasably connect together said handle forming portions to form a handle.

2. The combination with a basket and a cover having notches in the opposite side edges thereof, of handle forming members, means on the members attaching the members respectively to portions of the bottom of the basket, means for releasably connecting the free extremities of said members to form a handle, portions of said members being disposed respectively in the notches in said cover in a manner to hold the cover in place, and means for preventing said members from being detached.

3. The combination with a basket having a bottom and sides, of handle forming members each having a portion impaled in said bottom, portions of the basket overlying portions of said members to prevent the portions of the members impaling the bottom from being detached, said members each having a flexible portion extending above its related side of the basket and capable of being flexed or bent, there being a hook at the extremity of each flexible portion, the hook of one flexible portion being capable of a hooking engagement of the other flexible portion and the hook of the latter flexible portion capable of a hooking engagement of the former flexible portion, and portions of the hook engaging each other when the hooking relationship between the flexible portions is set up to prevent relative separation of the flexible portions when the weight of the basket and its contents is on said handle forming members.

MAJOR TUCKER.